United States Patent Office 3,014,675
Patented Dec. 26, 1961

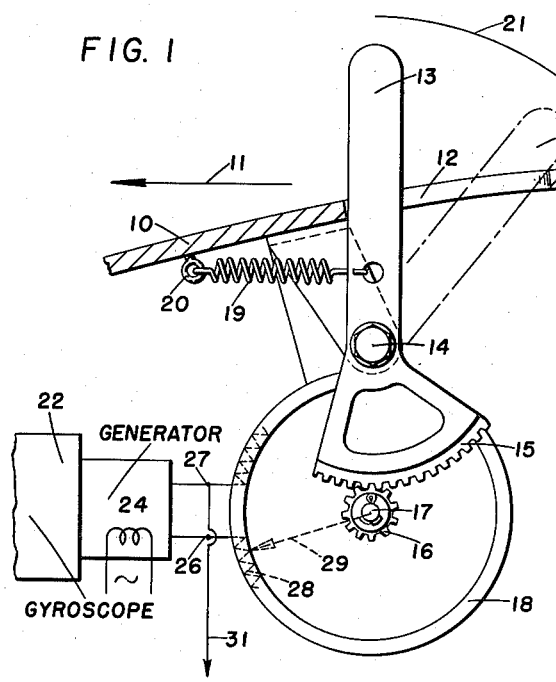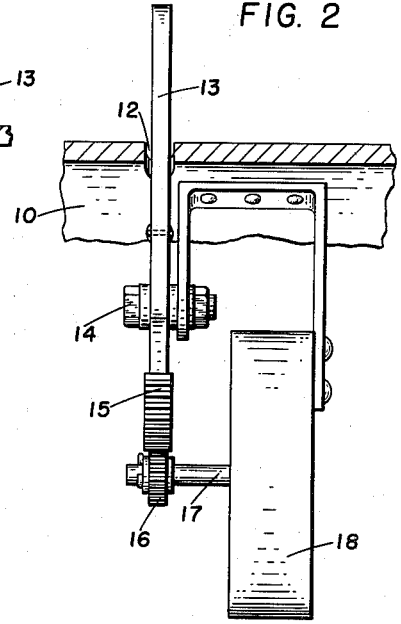

3,014,675
DEVICE FOR MOVING A CONTROL SURFACE IN ACCORDANCE WITH THE DENSITY AND VELOCITY OF THE AIR STREAM
Frederick M. Lewis, Grosse Pointe, Mich., assignor to the United States of America as represented by the Secretary of the Navy
Filed Aug. 22, 1949, Ser. No. 111,746
3 Claims. (Cl. 244—76)

The present invention relates to a device for controlling the flight of an aerial vehicle in accordance with the density and velocity of the surrounding atmosphere. More particularly, it relates to a device for indicating and correcting for the changing resultant force produced by an air stream as the velocity of the stream and the density of the air in the stream are varied.

A guided missile is generally flown through a wide range of altitudes with a corresponding range of values of air densities; and, while it is considered as traveling at a constant speed after a short initial acceleration period, actually, due to the action of gravity, its speed varies from that constant value if its angle of climb changes. Moreover, changes in its velocity are produced also by any changes in the angle of attack. Since the effective action of a control surface, such as a rudder, is expressed by $$\frac{k\rho V^2}{2}$$

wherein $k$ is usually a constant, $\rho$ is the air density, and V is the velocity, it can readily be seen that changes of altitude and/or velocity will affect the action of the control surface on the missile. Changes in the above-mentioned conditions require changes in the operating deflection of a control surface to produce constant resultant effects on the missile. Since the range of densities is relatively great and the range of velocities is relatively small, it is evident that the action of a control surface is affected to a greater extent by changes in altitude than by normal changes of velocity.

Heretofore, compensation of control-surface motion has been effected either by means of an aneroid mechanism, or by an electric altimeter of a type developed by the Bendix Aviation Company, in which changing air pressure affects the electrical resistance of thin metallic filaments exposed to said air and suitably connected into an electrical circuit. Both of these devices act only indirectly in respect to changes in density and take no account of velocity. They require additional amplifying equipment, interposed between themselves and the main circuits, for the movement of the control surfaces. This extra amplifying equipment takes up space, is heavy and requires operating power in addition to that used in the control circuit.

The device of the present invention was conceived to provide means for eliminating such extra amplifying equipment and its power supply. This device makes use of the similarity between the formula for lift of an airfoil, which permits calculation of the deflecting force of a control surface, and the formula for drag. In the formulas, lift is equal to $$C_L \frac{\rho}{2} S_1 V^2$$

and $$\text{drag} = C_D \frac{\rho}{2} S_2 V^2$$

where $C_L$ is the coefficient of lift, $C_D$ is the coefficient of drag, $\rho$ is the density of the air, $S_1$ is the area of the surface producing the lift, $S_2$ is the area of the surface producing the drag, and V is the velocity of the missile. Thus, it can be seen that lift/drag equals $$\frac{C_L S_1}{C_D S_2}$$

at all times. That is, when the drag increases, the force produced by a control surface at a given angle of attack increases proportionately and, in order to maintain a constant control force, the angle of attack must be decreased as drag increases and vice versa. It is evident that a probe which would measure drag would provide a means for introducing corrections into the setting of control surfaces to maintain constant control forces. Such a device would be an improvement over previously used devices in that it would correct for changes in speed as well as for changes in air density, and would eliminate the somewhat complicated problem of supplying static air pressure to a measuring device. This becomes increasingly important in the transonic and supersonic regions.

Accordingly, one object of the present invention is to provide a mechanism for continuously adjusting the angular setting of a control surface on a missile, to maintain a constant deflecting force on said missile under varying conditions of air density and missile speed.

A further object of the invention is to provide such a mechanism which is lighter, less complicated and more rugged than previous devices for the same general purpose, and which eliminates the necessity for providing an extra amplifier and its associated power supply.

Other objects and many of the attendant advantages of this invention will be appreciated readily as the same becomes understood by reference to the following detailed description, when considered in connection with the acompanying drawings, wherein:

FIG. 1 is a side view of the device as installed in a missile, a fragment of the missile shell being shown in section;

FIG. 2 is a corresponding rear elevation; and

FIG. 3 is a diagram of a typical control circuit including the new device.

Referring first to FIGS. 1 and 2, 10 represents a fragment of the forward portion of the external shell of a guided missile which is moving in the direction of arrow 11. The shell is pierced by a longitudinal slot 12, through which projects a probe or lever arm 13 pivoted on a stud 14 inside the missile. A gear sector 15 mounted on the inner end of the probe 13 is concentric with the stud 14 and engages a pinion 16 on the shaft 17 of a voltage divider 18. A suitable spring, such as tension spring 19 secured at one end to an anchorage 20 in the missile, urges the probe 13 forward in the slot 12. The tension of the spring 19 may be preset so that the device may be adjusted for maximum efficiency on the missile on which it is installed.

In operation, the missile moving through the air in the direction indicated by the arrow 11 produces a drag action of the air on the external portion of the probe 13, tending to rotate it about the stud 14 in the direction of arrow 21, against the force of spring 19. This motion continues until the drag force on the probe is balanced by the force of the spring. Motion of the probe changes the setting of the voltage divider 18 through interaction of the sector 15 and the pinion 16. It should be understood that the motion of the probe can be applied also to operate other types of mechanical or electrical components, for example, a synchrogenerator. Moreover, a dynamic damper of any desired design may be used to prevent unwanted oscillation of the device.

Referring now to FIG. 3, the device is illustrated as applied to a control-surface actuating mechanism, here shown as a roll stabilizer, although it should be understood that it is equally well applicable elsewhere, for example, to pitch or yaw stabilization. Moreover, the device can be used with any signal source and obviously is not limited to use with a gyroscope. As shown, a gyroscope 22 furnishes information concerning the rate and direction of roll.

A control surface, illustrated as an airfoil 23 on the missile, is deflectable from the neutral position shown to produce a restoring torque which tends to oppose the roll. A signal generator 24 on the gyroscope 22 produces a voltage proportional to the deflection of the gyroscope from its at-rest position. A synchrogenerator 25 on the shaft of the air foil 23 likewise produces a voltage proportional to the deflection of the said control surface from its neutral or no-lift position.

The output terminals 26 and 27 of the signal generator 24 are connected to the ends of the voltage divider resistor 28. The terminal 27 is connected also to one terminal of the synchro-generator 25, through conductor 31. The rotatable contact arm 29 mounted on the shaft 17 of the voltage divider 18 is connected to one input terminal of an amplifier 33, and the remaining terminal of the synchrogenerator 25 is connected to the other input terminal of the amplifier through conductor 32.

The amplifier 33 is so designed that the magnitude of is alternating output voltage and the phase relationship between said voltage and that of the source 38 of alternating current power that energizes the amplifier are controlled respectively by the magnitude and polarity of the input signal, and the output either leads or lags the power source 38 by ninety electrical degrees. The output of the amplifier 33 is fed to one winding 34 of a two-phase motor 35, the other winding 36 of which is connected directly to the said power source 38.

A crank 37 on the shaft of the motor 35 actuates a transfer valve 39 through a valve stem 40 to control the flow of oil under pressure from a source 41 through one or the other of two passages 42 and 43 to a corresponding end of a cylinder 44 wherein a piston 45 is moved to cause deflection of the control surface 23, the piston being connected to the control surface by means of a rod 46 and a crank 47 pivotally connected thereto and secured to the shaft of the control surface. A spring 48 on the valve stem 40 of the transfer valve 39 is so arranged that, in the absence of any force applied by the motor 35 through the crank arm 37, it holds the valve centered to cover both of the passages 42 and 43 and thus prevent flow of oil to or from the cylinder 44.

When the missile is not rolling, the gyroscope 22 remains in its at-rest position and no voltage is produced by the signal generator 24. If, at the same time, the control surface 23 is also in its mid-position, no voltage is produced by the synchrogenerator 25, and no signal is supplied to the input side of the amplifier 33, and consequently, the amplifier does not furnish an output signal to energize the winding 34 of the motor 35. Since the motor is of the two-phase type, no torque is produced, the spring 48 holds the valve 39 to prevent flow of oil to, and operation of, the piston 45, and the control surface 23 remains in its mid-position.

If, on the other hand, the missile is rolling, the gyroscope 22 is deflected from its at-rest position through an angle proportional to the roll angle and a corresponding voltage is produced by the signal generator 24. Assuming, for the purpose of this explanation, that the control surface 23 is initially at its mid-position, then no voltage is produced by the synchrogenerator 25 and the input signal to the amplifier 33 is the voltage produced by the signal generator 24 alone. Under this condition, the output of the amplifier, which constitutes the excitation voltage of the winding 34 of the motor 35, is proportional to the deflection of the gyroscope 22 and its phase relationship to the excitation voltage of the winding 36 is dependent on the direction in which the gyroscope is deflected or, indirectly, on the direction of roll of the missile.

Excitation of the winding 34 causes the motor 35 to tend to rotate to shift the valve 39 to position to admit oil under pressure to the corresponding end of the cylinder 44, causing movement of the piston 45 and of the control surface 23 in the proper direction to counteract the roll. As the control surface moves from its mid-position, the synchrogenerator 25 produces a voltage opposing that of the signal generator 24 and thus the input to the amplifier is the difference between these voltages. This reduces the excitation of the winding 34 in the motor 35 and thus its torque. As the torque of the motor decreases, the spring 48 progressively closes the valve 39 until, when the voltages are equal, movement of the control surface 23 ceases.

As the deflected control surface aerodynamically reduces the roll angle, the gyroscope 22 returns toward its at-rest position, the output voltage of the signal generator 24 drops below that of the synchrogenerator 25 and thereby the input signal to the amplifier 33 becomes reversed in polarity, the phase relationship of the excitation of the motor winding 34 is reversed with respect to that of the winding 36, the motor rotates in the reverse direction, oil is admitted by the valve 39 to the opposite end of the cylinder 44, the piston 45 returns the control surface 23 towards its mid-position, the output voltage of the synchrogenerator 25 drops, and the end results of the operation are to stop the roll of the missile and set the control surface in its mid-position.

It will be noted that, in the above description of the operation of the circuit and apparatus, the function of the voltage divider has not yet been explained. In other words, the full voltage output of the signal generator 24 is assumed to be opposed to the voltage generated by the synchrogenerator 25. Thus, for any given angle of roll there would be only one corresponding setting of the control surface 23. As a result, the steering response could, at best, be correct for only one atmospheric density and over-correction of the roll would result upon increase of density, while under-correction would occur upon decrease of density.

Consequently it would obviously not be possible to prevent roll or the like in a guided missile that must operate at sea level as well as at great altitudes, and that is not always uniform in speed. Compensation for this variation of speed, and of atmospheric density with altitude, is provided by the voltage divider 18 as follows:

The voltage divider 18 is so installed that, as the air-drag on the probe 13 decreases, the arm 29 approaches the terminal 26, raising the fraction of the apparent gyroscope deflection signal voltage, delivered between conductors 30 and 31. This results in an increase in the deflection of the surface 23 for a given gyroscope deflection, or rate of roll, as the air density or the missile speed decreases. By proper choice of gear ratio between the gear sector 15 and the pinion 16 and by proper initial positioning of the arm 29 with respect to the resistor 28, the device can be made to compensate completely for variations of drag and lift with altitude and speed to produce a constant relationship between the rate of roll and the stabilizing force opposing the roll.

While the application of the drag-measuring device described above relates to a roll-stabilizing control system, it can be applied with equal facility to guidance control systems, to the end that the deflecting forces may be held to a constant value irrespective of altitude and speed.

Obviously many modifications and variations of the present invention are possible in the light of the above teachings. It is therefore to be understood that within the scope of the appended claims the invention may be practised otherwise than as specifically described.

What is claimed is:

1. In a control system for an aerial vehicle having a steering element exposed to the airstream about the vehicle, a lever pivotally mounted in said vehicle and extending into the airstream about the vehicle, a signal generator providing a signal in accordance with the angular position of the steering element, a voltage divider having a resistor disposed in circular fashion and connected to said generator, said voltage divider also having a slider actuable by said lever for rotatable movement along said resistor, a second signal generator connected in parallel with said resistor and providing a signal representative of the angular deviation of the vehicle from course, and means connected to said first signal generator and said slider for positioning said steering element in accordance with signals derived from said signal generators, said signals being modified by the movement of said slider caused by changes in aerodynamic drag on said lever.

2. A control system for an aerial vehicle having a steering element, comprising, a gyroscope, a signal generator coupled to said steering element for controlling the signal output of said generator in accordance with the angular position of the steering element, an amplifier having one input lead connected to said generator, a voltage divider having a circular resistor element in series with said signal generator and said amplifier, and a slider connected to the other input lead of said amplifier, a second signal generator coupled to said gyroscope for controlling the signal output of said second generator in accordance with changes of direction of the vehicle from course, said second generator being connected in parallel with said resistor, a motor energizable by the output of said amplifier, a transfer valve operable by said motor, a source for supplying high pressure fluid to said transfer valve, a cylinder connected to said transfer valve for receiving fluid therefrom, a piston working in said cylinder and coupled to the steering element, said piston being operable by fluid from said transfer valve to adjust the angular position of said steering element in accordance with the output of said amplifier, and a spring biased lever pivotally mounted in said vehicle and having an arm extending outwardly into the airstream about the vehicle, said lever engaging said slider for rotatable movement along said resistor to modify the signals produced by said generators in accordance with the aerodynamic drag imposed upon said lever.

3. In combination with an aerial vehicle having a steering element exposed to the air stream about said vehicle, and a control system including a sensing device providing an output representative of the orientation of said vehicle in flight, a signal generator for producing signals indicative of the deflection of said steering element, and means operable by said sensing device and said signal generator for deflecting said steering element; apparatus for modifying said sensing device output in accordance with the speed and density of the air stream surrounding said vehicle, said apparatus comprising a pivotally mounted lever having one end extending into the air stream and movable by aerodynamic drag forces acting thereupon, a gear sector mounted at the opposite end of said lever, a spring for restraining the pivotal motion of said lever and for counteracting said drag forces, a pinion cooperating with said gear sector to convert pivotal motion of said lever into rotary motion of said pinion, and a voltage divider electrically connected to said sensing device, said voltage divider including a resistor disposed in circular fashion and a rotatable contact arm mechanically connected to said pinion whereby pivotal movement of said lever produces rotation of said contact arm to adjust the magnitude of the output of said sensing device.

References Cited in the file of this patent

UNITED STATES PATENTS

| | | |
|---|---|---|
| 1,885,578 | Boykow | Nov. 1, 1932 |
| 2,387,795 | Isserstedt | Oct. 30, 1945 |
| 2,464,629 | Young | Mar. 15, 1949 |
| 2,525,038 | Kutzler | Oct. 10, 1950 |